United States Patent
Kim (10) Patent No.: US 8,018,807 B2
(45) Date of Patent: Sep. 13, 2011

(54) METHOD AND APPARATUS OF COMPENSATING FOR MISALIGNMENT IN AN OPTICAL DISK DEVICE

(75) Inventor: Kyung Min Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 11/701,506

(22) Filed: Feb. 2, 2007

(65) Prior Publication Data

US 2007/0206452 A1 Sep. 6, 2007

(30) Foreign Application Priority Data

Mar. 8, 2006 (KR) .................. 10-2006-0021846

(51) Int. Cl.
*G11B 7/00* (2006.01)
(52) U.S. Cl. .................. 369/53.28; 369/44.29
(58) Field of Classification Search .............. 369/53.23
See application file for complete search history.

(56) References Cited

U.S. PATENT DOCUMENTS

| | | | |
|---|---|---|---|
| 5,134,602 A * | 7/1992 | Baca et al. ............ | 369/44.27 |
| 5,859,824 A * | 1/1999 | Izumi et al. ............ | 369/44.29 |
| 6,192,010 B1 * | 2/2001 | Wang et al. ............ | 369/53.11 |
| 6,295,256 B1 * | 9/2001 | Kimikawa et al. ...... | 369/44.32 |
| 2004/0042355 A1 * | 3/2004 | Yamamoto et al. ..... | 369/44.32 |
| 2006/0171265 A1 * | 8/2006 | Fukui ................... | 369/44.28 |
| 2006/0215500 A1 * | 9/2006 | Hatanaka et al. ...... | 369/1 |
| 2006/0285452 A1 * | 12/2006 | Nakane ................ | 369/44.29 |
| 2009/0010119 A1 * | 1/2009 | Kayama et al. ........ | 369/47.15 |

FOREIGN PATENT DOCUMENTS

WO  WO 2006101077 A1 * 9/2006

* cited by examiner

*Primary Examiner* — Hoa T Nguyen
*Assistant Examiner* — Mark Fischer
(74) *Attorney, Agent, or Firm* — Ked & Associates LLP (57) ABSTRACT

A method and apparatus of compensating for misalignment in an optical disk device includes detecting a plurality of focus error signals, comparing the focus error signals, and shifting a position of an optical lens based on the comparison. Alternatively, a one or more of the focus error signals may be compared to a reference signal and a corresponding shift may be performed. When the lens is shifted, an optical spot corresponding to an optical beam reflected from a disk surface is corrected to a position which reduces or eliminates misalignment errors attributable to one or more elements of the pickup.

26 Claims, 8 Drawing Sheets

NORMALLY CONFIGURED         ABNORMALLY CONFIGURED

FIG. 4(a)  FE SIGNAL

FIG. 4(b)  FE SIGNAL

FIG. 4(c)  FE SIGNAL

FIG. 4(d)  FE SIGNAL

METHOD AND APPARATUS OF COMPENSATING FOR MISALIGNMENT IN AN OPTICAL DISK DEVICE

BACKGROUND

1. Field

One or more embodiments described herein relate to an optical disk device.

2. Background

Figure 1:
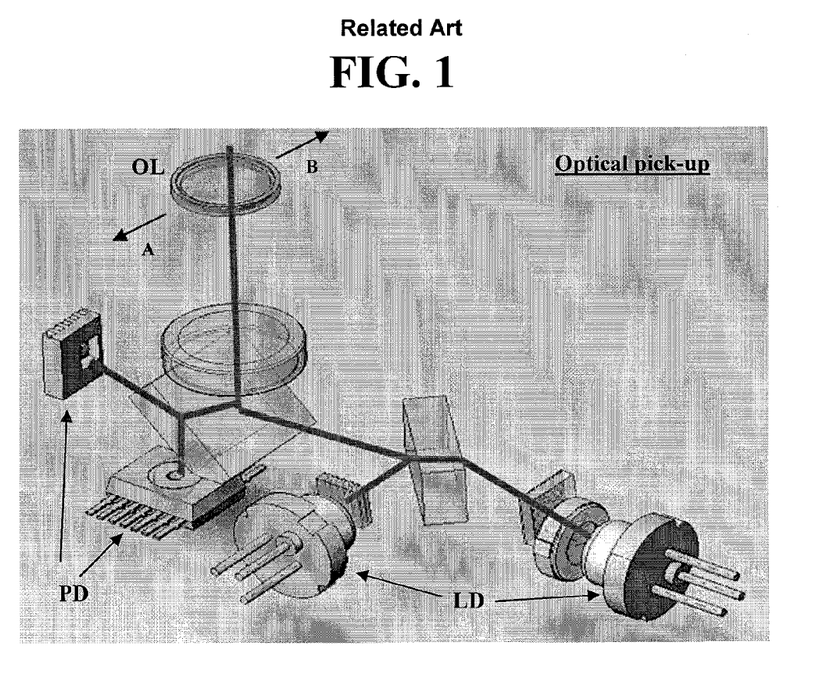
FIG. 1 is a diagram showing an optical pickup for an optical disk device.

FIG. 1 is a diagram showing an optical pickup in an optical disk device. The optical disk device includes a light source, a number of optical elements, and a light-receiving element. The light source may be a laser diode (LD) which radiates a laser beam, and the optical elements may include an objective lens (OL), a collimator lens, a beam splitter, and a sensor lens used to focus a beam emitted from the LD on an optical disk. The light receiving element (e.g., a photodiode (PD)) converts a beam reflected from the optical disk into an electrical signal.

According to the background art, the locations of the photodetector and optical elements are determined based on a mechanical reference surface having a certain tolerance, or based on continuously varying servo signals or an RF signal. Once this determination is made, the locations of the PD and OL are fixed and no further adjustments can be made. Thus, if errors are made in determining or fixing the locations of the PD and OL, no corrective measures can be taken. The locations errors are considered highly undesirable because they can create distortions that prevent the pickup from recovering data from the disk during a read operation.

BRIEF DESCRIPTION OF THE DRAWINGS

The embodiments will be described in detail with reference to the following drawings in which like reference numerals refer to like elements wherein.

DETAILED DESCRIPTION

A method and apparatus in accordance with one or more embodiments described herein compensates for misalignment of various optical components in a pickup installed in an optical disk device. In accordance with at least one embodiment, this is accomplished by examining focus error signals received from the pickup to identify location errors of, for example, a photodiode element and/or one or more lenses. Once these errors are located, a series of adjustments are made to determine the adjustment that produces the best pickup performance. By implementing this best adjustment, errors may be corrected that may have arisen, for example, during the pickup manufacturing process or which may have been caused through use over time.

In an optical pickup, the light receiving element (e.g., PD) converts a beam reflected from the optical disc into an electrical signal. This signal is used as a basis for deriving a focus error (FE) signal, a tracking error (TE) signal, and a radio frequency (RF) signal. If the PD and/or lenses are misaligned, errors will appear in waveforms corresponding to the FE and/or RF signals. (These errors may also be generated by jitter that arises when, for example, a servo operation and/or reproduction operation is performed on the optical disc.) Embodiments described herein identify these errors and takes corrective action.

FIG. 2 shows, at (a), an optical spot detected by a photodetector when the photodetector and other optical elements in the pickup are considered to be accurately located. This beam is focused onto the center of an area that is partitioned into 4 cells labeled A, B, C, and D. At (b), a focus error signal generated based on the detected optical spot is shown. This FE signal has a substantially S-curve shape and may be generated, for example, when an objective lens (OL) is moved in upward and downward directions. (The optical spot in FIG. 2(a) is shown as having an elliptical shape. Those skilled in the art can appreciate that the spot may also have other shapes including a substantially circular shape).

Figure 3A:
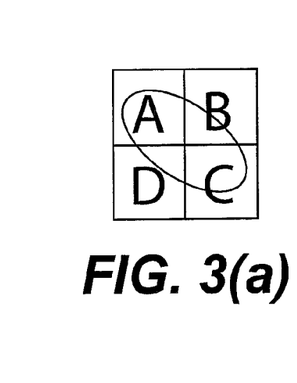
FIGS. 3(a) and 3(b) are diagrams showing how the shape of a reflected beam varies as an objective lens of a pickup moves in certain directions.
Figure 3B:
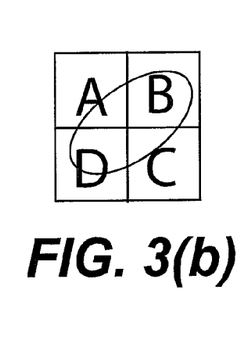

More specifically, in generating the FE signal, a sensor lens (constructed, for example, from a cylindrical lens) may be used to create an astigmatism by causing the focal length of an axis connecting cells A and C to differ from that of an axis which connects cells B and C. For example, as shown in FIG. 3(a), when an OL in the pickup is closer to an optical disk, an optical spot having an elliptical shape (produced from a beam reflected from an optical disk) is focused on the PD such that the long axis of the beam crosses cells A and C. As shown in FIG. 3(b), when the OL is farther from the optical disk, a beam having an elliptical shape is focused on the PD such that the long axis of the beam crosses cells B and D.

Using the above-described characteristics, an S-curve shaped FE signal is obtained based on a difference between the sum of signals output from cells A and C and the sum of signals output from cells B and D.

Figure 2A:
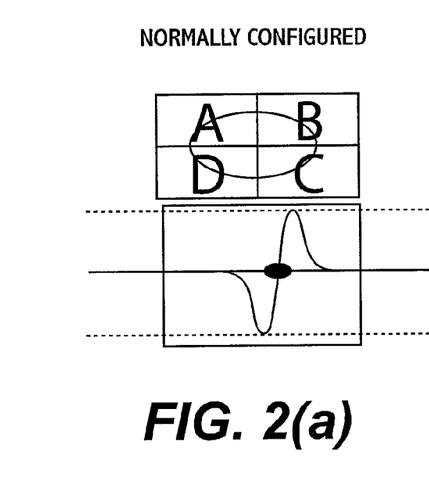
FIG. 2(a) is a diagram showing the shape of a reflected optical beam and its corresponding focus error signal detected by a photodiode in the case where the elements in an optical pickup device are considered to be in alignment.
Figure 2B:
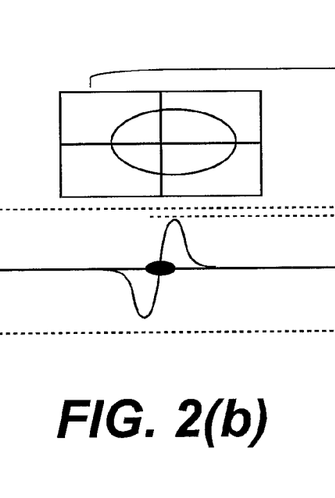
FIGS. 2(b)-(d) are diagrams showing the shapes of reflected optical beams and corresponding focus error signals generated when one or more elements in a pickup are misaligned.
Figure 2C:
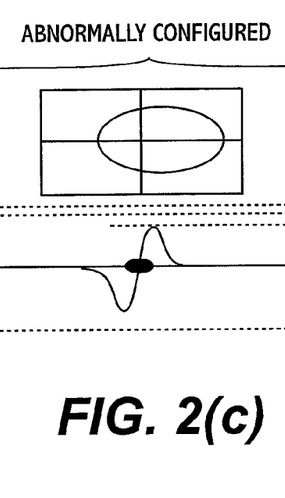
Figure 2D:
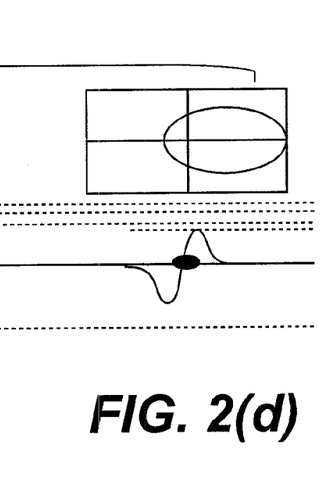

However, when the location of one or more elements in the pickup (e.g., LD, PD, OL, or other elements) change or are inaccurately located, the optical spot produced by the beam will deviate from the position shown in FIG. 2(a), e.g., may not be focused on the center of the PD. This may cause the location of the PD to be offset relative to an optical axis of the reflected beam. As a consequence, the waveform of the S-shaped FE signal may be distorted. This situation is illustrative shown in FIG. 2(b)-2(d), where the highest magnitude of the FE signal and the lowest magnitude of the FE signal are reduced.

A specific example of this distortion occurs when the OL in the pickup is located at the center of an actuator that supports the OL and when the locations of various other elements in the pickup are offset from their properly aligned locations. In this case, a beam reflected from a disk may not be focused on the center of the PD.

As a consequence, when the OL moves in radially inward or outward directions (e.g, the directions in which the OL moves for a tracking servo operation), as shown by reference characters A and B in FIG. 1, the beam reflected from the disk is focused on the PD in offset misalignment with a center of the PD. This misalignment proportional to an extent to which the OL is offset from the center of the actuator in radially inward or outward directions.

The distortion caused by these location errors are substantial, in that they may cause an optical disk device to misidentify a Compact Disk (CD)-R as a CD-RW disk, or vice versa. In addition, or alternatively, these errors may render the device unable to properly perform data reproduction or data recording operations because of an inability to perform accurate focusing and tracking servo operations.

In accordance with one embodiment, these errors are identified based on an analysis of the focus error signals generated in association with the misaligned optical spots received by the PD.

Figure 4A:
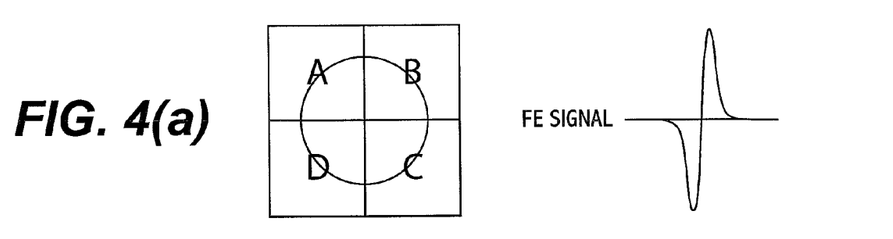
FIGS. 4(a)-4(d) are additional diagrams showing how the shape or position of a beam reflected from the surface of a disk varies as a result of misalignment.
Figure 4B:
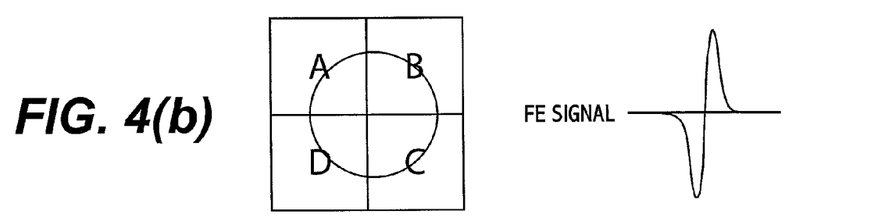
Figure 4C:
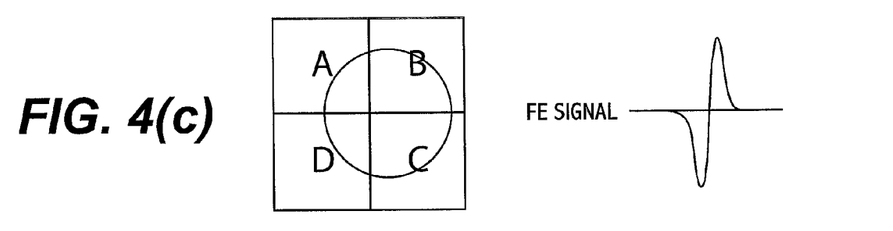
Figure 4D:
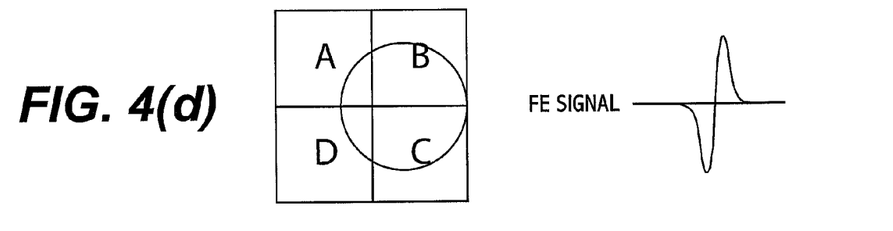
Figure 5:
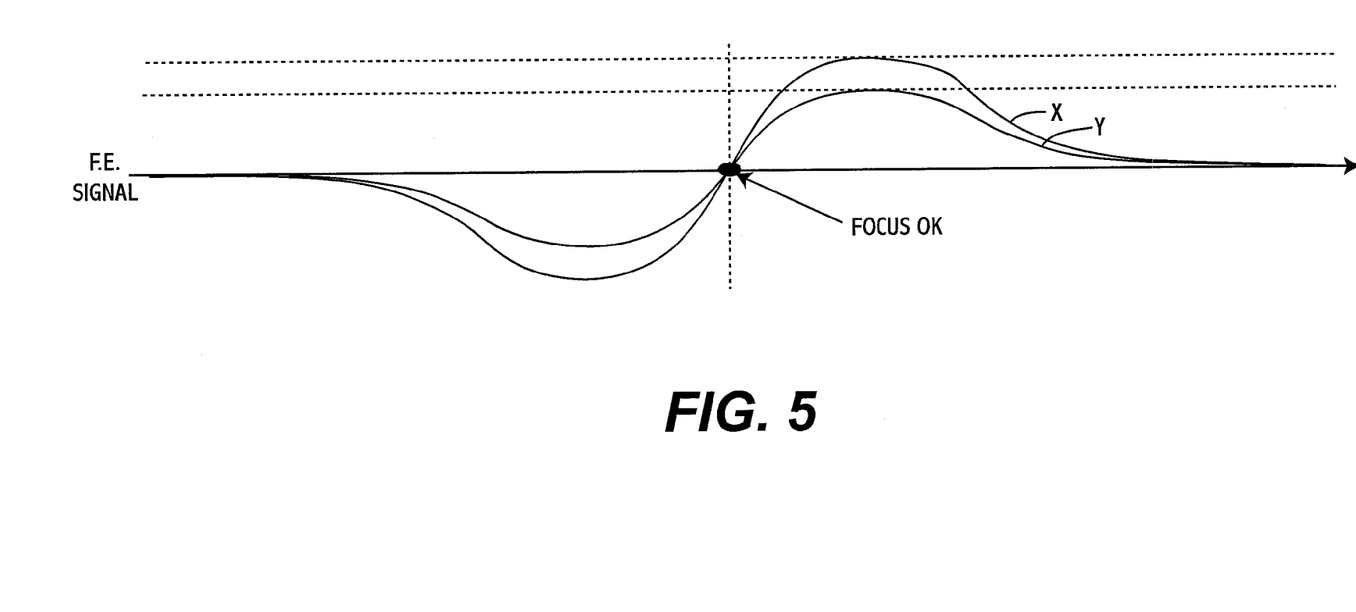
FIG. 5 is a diagram showing how a focus error signal generated from misalignment deviates from a reference signal, which, for example, may correspond to a focus error signal generated when no or a tolerable amount of misalignment exists in an optical device.

FIGS. 4(a)-4(d) are diagrams comparing different levels of S-shaped FE signal curves that are generated when various misaligned beams are focused on the PD. As shown, when the OL moves in a radially outward direction, the beam focused on the PD also moves along a line that separates cells A and B from the cells C and D. Therefore, the level of the S-shaped FE signal reduces when the OL moves in upward and downward directions. This reduction is shown in FIG. 5, where the FE signal (Waveform Y) generated when one or more the elements of a pickup misaligned has a smaller magnitude relative to the FE signal (Waveform X) generated when the pickup elements are aligned properly.

This misalignment may be explained in greater detail for the case where the OL moves in directions toward and away from the circumference of the disk when an offset exists relative to a center of the actuator. When this occurs, the levels of servo signals and an RF signal may be lowered. For this reason, the range of movement of the OL for the tracking servo operation is limited. Furthermore, when the OL is offset from the center of the actuator above a predetermined distance, a sled motor is driven so that the entire optical pickup moves and the OL moves to the center of the actuator again.

By using the characteristic that the movement of the OL causes the center of the beam focused on the PD to move, at least one embodiment compensates for mismatch between the center of the beam reflected from the disk and the center of the PD. A compensation operation may also be performed on the servo signals when the OL is placed at a location where the center of the reflected beam and the center of the PD match each other.

Figure 6:
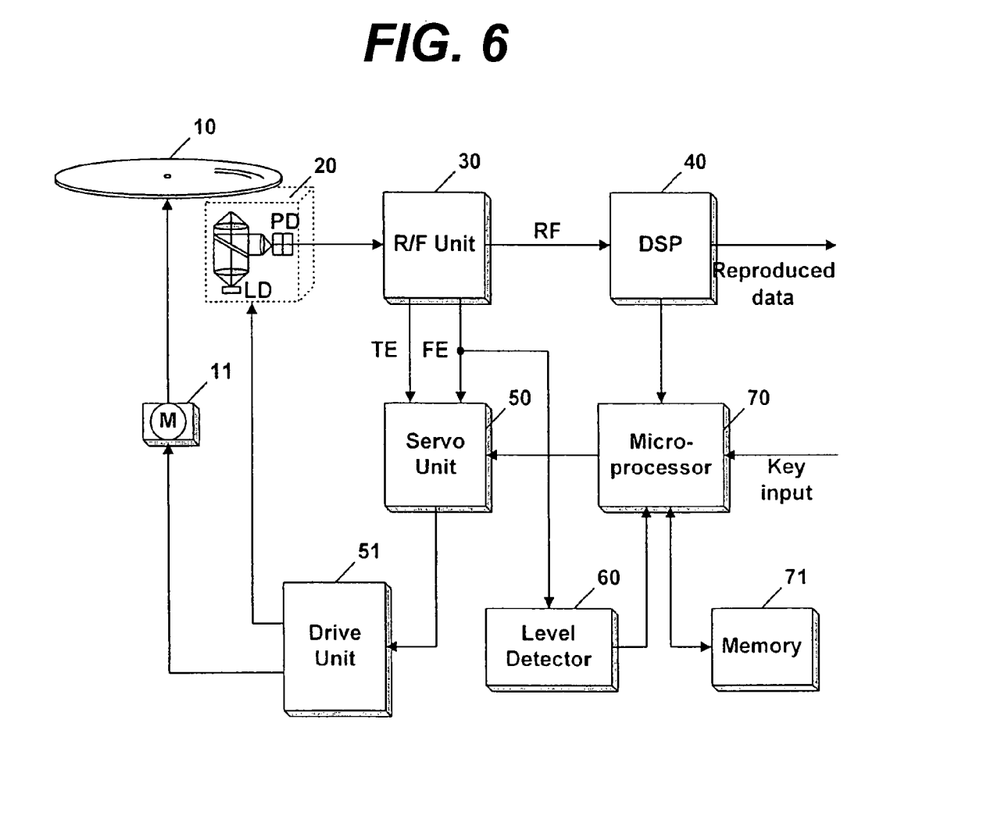
FIG. 6 is a diagram showing an example of an optical disk device which may be used as a basis for implementing a method of compensating for servo signals according to one embodiment.

FIG. 6 is a diagram showing an optical disk device which may be used to perform a compensating method according to one embodiment. The optical disk device includes a spindle motor 11, an optical pickup 20, an RF unit 30, a digital signal processing unit 40, a servo unit 50, and a drive unit 51. The spindle motor rotates an inserted optical disk 10.

The optical pickup records data on the optical disk or reads data from the optical disk.

The RF unit extracts an RF reproduction signal and servo signals (an FE signal and a TE signal) from a signal output by the optical pickup.

The digital signal processing unit 40 restores the output RF reproduction signal to original data.

The drive unit drives the spindle motor and the optical pickup. And, the servo unit controls the driving of the drive unit 51.

The optical disk device further includes a level detection unit 60 for detecting the levels of the FE signals and a microcomputer 70 for detecting the location at which the level of the FE signal is highest while moving the OL of the optical pickup 20 in a horizontal direction, and for performing an adjustment operation on the servo signals while maintaining the OL at the detected location. A memory 71 may be included to store the detected location value and necessary data.

As previously discussed, the optical pickup 20 may include an objective lens (OL), an light emitting element such as a laser diode (LD), and a light receiving element such as a photodetector (PD). A PD having four cell divisions such as shown in 2 and 4 may be used as the PD.

Figure 7:
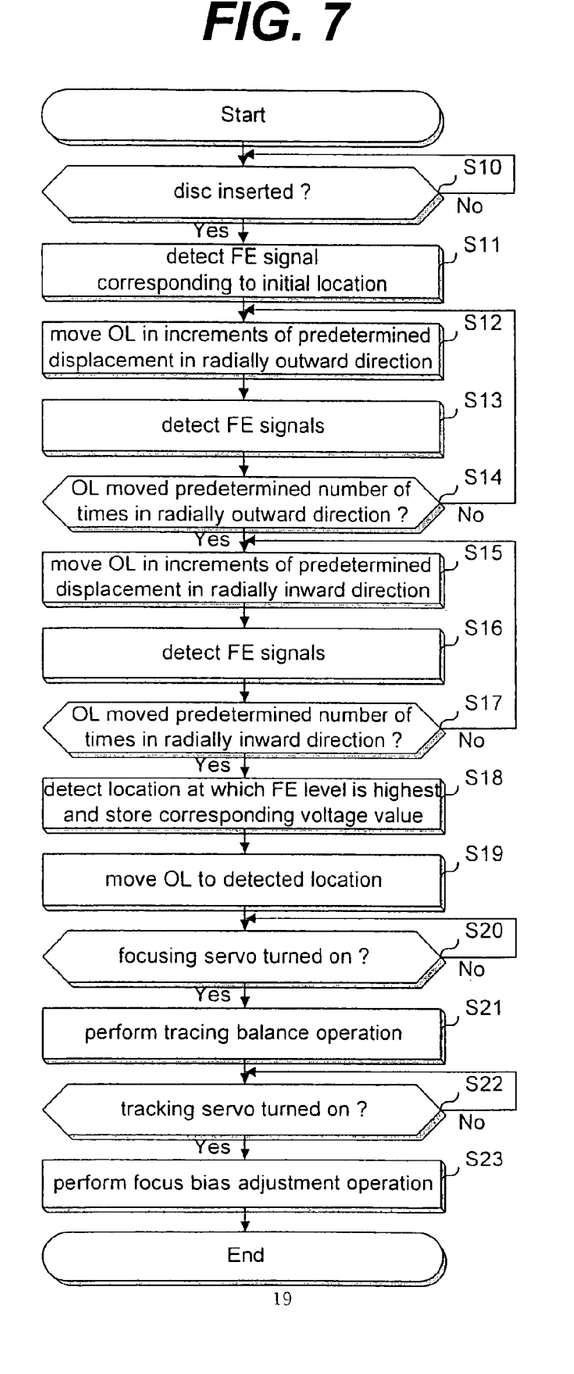
FIG. 7 is a diagram showing steps included in a method of compensating for misalignment in an optical disk device according to one embodiment.

FIG. 7 is a flowchart showing steps included in a method of compensating for servo signals according to one embodiment. For illustrative purposes, this method is described in detail with reference to the device of FIG. 6.

When an optical disk 10 is inserted at step S10, a scheduled initial operation is performed. During this operation, microcomputer 70 may move the OL of the optical pickup 20 up and down in a vertical direction from a current location, which, for example, may be an initial or default location. This movement is controlled by servo unit 50. The microcomputer may also detect the level of an S-curve shaped FE signal by controlling the level detection unit 60, at step S11.

Thereafter, the microcomputer 70 controls the servo unit 50 to move the OL in predetermined increments (for example, 10 μm) in a horizontal direction, for example, in the radially outward direction, from the current location at step S12. At this time, voltage required to move the OL in increments of the predetermined displacement in the outer circumference direction is applied to the actuator of the optical pickup.

The microcomputer 70 moves the OL up and down in the vertical direction from the moved location by controlling the servo unit 50, and detects the levels of FE signals by controlling the level detection unit 60 at step S13.

The movement of the OL in the radially outward direction and the operation of detecting the level of an S-curve are repeated a predetermined number of times (for example, 5 times) at step S14.

Thereafter, the microcomputer controls the servo unit to move the OL to the initial location again and then the OL moves in predetermined increments of displacement (for example, −10 μm) in the radially inward direction from the initial location at step S15. At this time, the voltage required to move the OL in the predetermined increments in the radially inward direction is also applied to the actuator. The microcomputer may move the OL up and down in the vertical direction from the moved location by controlling the servo unit, and may detect the levels of the FE signals by controlling the level detection unit 60 at step S16.

Movement of the OL in the radially inward direction and the operation of detecting the levels of S-curves are repeated a predetermined number of times equal to an assigned number (for example, 5 times) at step S17.

Thereafter, the microcomputer detects the location at which the level of the S-curve is highest from among the initial location of the OL and the subsequent locations of the OL in the radially inward and outward directions, that is, for example, +10 μm, +20 μm, +30 μm, . . . and −10 μm, −20 μm, −30 μm. The detected location and/or a corresponding voltage value is then stored in memory 71, at step S18. As a result, for example, CD-R and CD-RW disks can be identified based on the levels of S-curves, i.e., the types of disks can be distinguished from one another based on the highest detected level of the S-curves.

Thereafter, the microcomputer controls the servo unit, so that the stored voltage value is applied to the actuator. The OL then moves to a corresponding location, at step S19, and a focusing servo is turned on at the moved location, at step S20.

The microcomputer then controls the servo unit 50 during a state when the focusing servo is turned on. A tracking balance adjustment operation for reducing a bias generated by the TE signal is then performed at step S21. The tracking servo is then turned on in response to the adjusted TE signal at step S22.

Thereafter, the microcomputer controls the servo unit during a state when the tracking servo is turned on. A focus bias adjustment operation is then performed to optimize the focal point of the OL with respect to the optical disk 10 at step S23. An initial operation that must be performed when an optical disk 10 is inserted is therefore completed. Thereafter, a reproduction operation is performed on the inserted optical disk.

As described above, the tracking balance adjustment operation and the focus bias adjustment operation are performed based on the optimized location of the OL, which is detected through steps S10 to S18. Through these steps, mismatch between the optical axis and the center of the PD can be compensated for and the performance of a reproduction or recording operation can be improved.

The detection of the optimized location of the OL and the initial operation based on the detection may be performed whenever a disk is inserted. Furthermore, the voltage value corresponding to the detected optimized location is stored in memory, for example, non-volatile memory, and the initial operation at steps S19 to S23 may be performed alone based on the stored voltage value. The operation of detecting the optimized location of the OL (steps S10 to S18) may be performed at predetermined time intervals, for example, only once per month.

Accordingly, mismatch between the optical axis and the center of the PD can be compensated for, error occurring in identifying the types of disks can be minimized, and the performance of a reproduction or recording operation can be improved.

Figure 8:
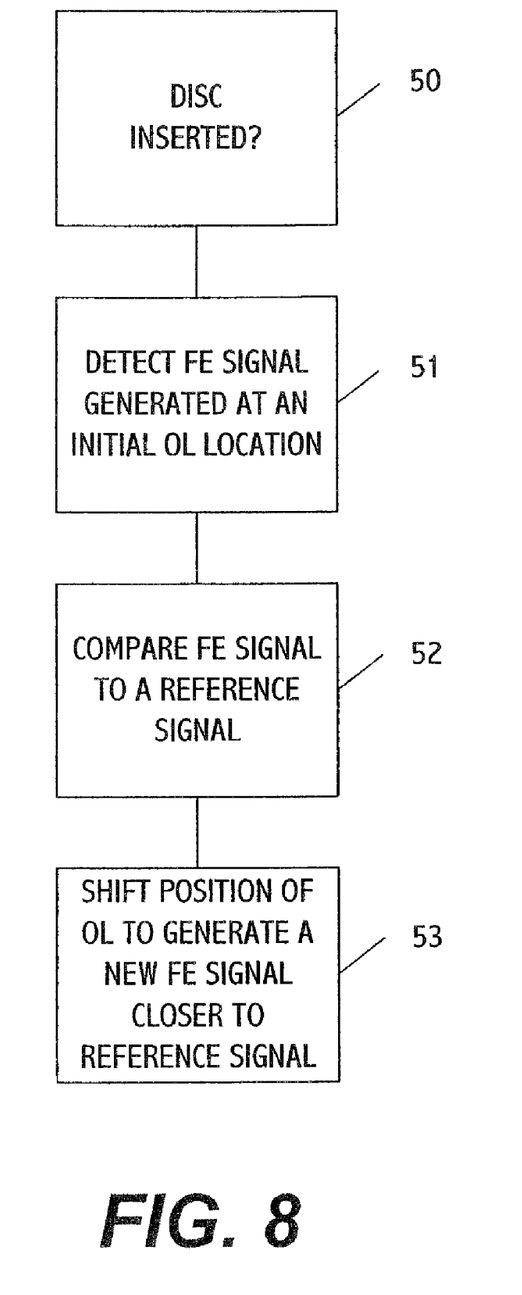
FIG. 8 is a diagram showing steps included in a method of compensating for misalignment in an optical disk device according to another embodiment.

FIG. 8 is a diagram showing steps included in a method for detecting misalignment in a pickup according to another embodiment. When an optical disk is inserted, at step S50, a scheduled initial operation is performed. During this operation, microcomputer 70 may move the OL of the optical pickup 20 up and down in a vertical direction from a current location, which, for example, may be an initial or default location. This movement is controlled by servo unit 50.

At step S51, the microcomputer may also detect the level of an S-curve shaped FE signal by controlling the level detection unit 60.

At step S52, the FE signal is compared to a reference signal, which, for example, may correspond to a pickup having proper alignment or, alternatively, a pickup having another desired characteristic. This comparison may be performed, for example, by comparing a peak amplitude of the reference signal to a peak amplitude of the detected FE signal.

At step S53, microcomputer 70 controls the servo unit 50 to shift the position of the OL in a predetermined direction. The direction may be arbitrarily determined or determined based on the characteristics of the FE signal. If arbitrarily determined, the OL is shifted to a new arbitrary position and a new FE signal is detected. The new FE signal is then compared to the reference signal. If a magnitude of the new FE signal is closer to the magnitude of the reference signal, then additional OL shifts and FE signals are generated and compared to the reference signal. The OL position that generates an FE signal closest to the reference signal (e.g., signal magnitude) is then used as a basis to improve the pickup performance.

Alternatively, the microcomputer may be able to determine the direction in which the OL is to be shifted based on the amount the optical beam spot is skewed from cells A-D in the photodetector. The OL is then shifted repeatedly and additional FE signals are generated and compared to the reference signal until the closest match is obtained. The OL position corresponding to the closest match is then used as a basis for improving pickup performance.

Figures 9A, 9B, 9C:
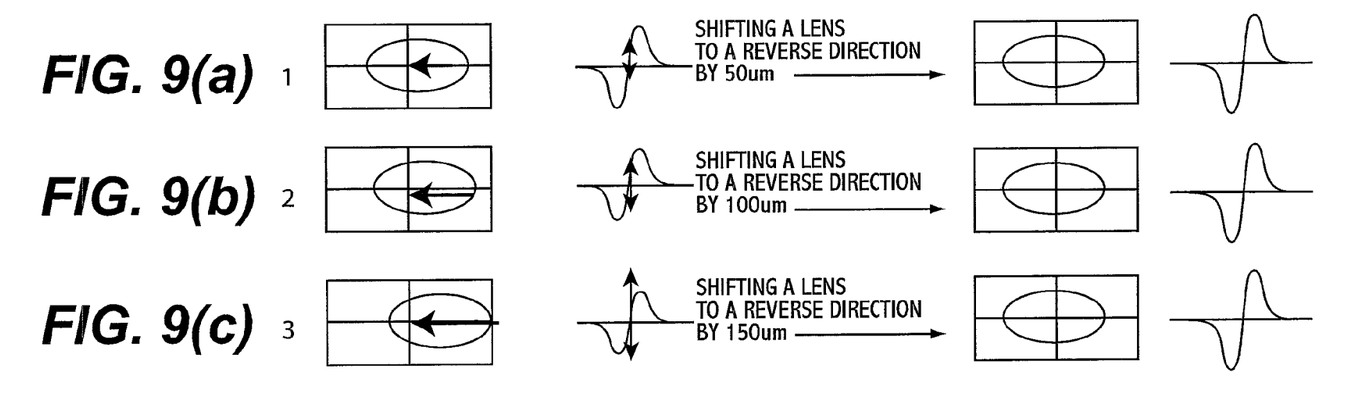
FIGS. 9(a)-9(c) are diagrams showing how varying degrees of misalignment in a pickup may be corrected in accordance with one embodiment.

An illustrative application of a method according to one or more of the foregoing embodiments may be described with reference to FIGS. 9(a)-9(c). As shown in FIG. 9(a), an optical spot produced from an optical beam reflected from a disk is offset by a first amount relative to cells A-D when focused on the photodiode. This offset is apparent from the waveform of its corresponding FE signal.

Then, the highest magnitude of the FE signal waveform is compared to FE signal waveforms generated at other OL positions according to the embodiment of FIG. 7, or alternatively by comparing the FE signal waveform to a reference FE signal according to the embodiment of FIG. 8.

Based on these comparisons, the position of the OL (or another lens or optical component in the pickup) may be shifted until the highest FE signal magnitude is achieved or, alternatively, until the FE signal waveform is found that at least substantially matches the reference FE signal waveform. These effects are shown in FIG. 9(a), where the lens is shifted 50 μm in order to correct the misalignment. FIGS. 9(b) and 9(c) show similar shifts to correct misalignments of 100 μm and 150 μm respectively.

In accordance with another embodiment, a method of compensating for servo signals in an optical disk device includes detecting focus error signals at a plurality of locations; selecting a location corresponding to the greatest one of the detected focus error signals; and compensating for the servo signals detected at the selected location.

The focus error signals are detected while an objective lens moves in increments of a predetermined displacement in the direction in which the objective lens moves to perform a tracking servo operation. Furthermore, the focus error signals are S-curve shaped signals detected while an objective lens moves up and down in the vertical direction.

The method may further comprise storing information about the selected location in memory. The information about the selected location includes a voltage value that is applied to an actuator to move the objective lens to the selected location.

The detecting, selecting, and storing may be performed at predetermined time intervals, and the compensating is performed based on the information stored in the memory.

The detecting, selecting, and compensating may be performed whenever a disk is inserted into the device. The type of a disk may be identified based on the focus error signals detected at the plurality of locations.

The compensating may comprise performing a tracking balance adjustment operation in the state in which a focusing servo is turned on. Furthermore, the compensating may comprise performing a focus bias adjustment operation in the state in which in a tracking servo is turned on.

In accordance with another embodiment, a method of compensating for misalignment in an optical disk device is provided, which method comprises detecting a focus error signal, comparing the focus error signal to a reference signal, and shifting a position of an optical lens to reduce a difference between the focus error signal and the reference signal. The lens may be an objective lens in a pickup which is shifted in a reverse direction relative to an offset direction of a beam reflected from an optical disk. The reference signal may be stored in memory and preferably corresponds to a pickup which is properly or optimally aligned.

In accordance with another embodiment, an apparatus is provided which compensates for misalignment in an optical device by performing any one of the embodiments of the methods previously described.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of compensating for misalignment in an optical disk device, the method comprising:
    detecting focus error signals at a plurality of locations including a first location which corresponds to an initial location of an objective lens and second locations of the objective lens which correspond to predetermined displacements from the first location in radially inward and outward directions, wherein at least one of the second locations arranged at the radially outward direction relative to the first location include a series of locations or the second locations arranged at the radially inward direction relative to the first location include a series of locations;
    detecting magnitudes of the focus error signals; and
    shifting radially the objective lens according to the detected magnitudes of the focus error signals to reduce misalignment in the optical disk device, wherein each focus error signal is generated independently of information corresponding to a drive signal for moving a position of the objective lens to a corresponding one of the first and second locations.

2. The method of claim 1, further comprising: determining which of the detected magnitudes of the focus error signals is the greatest, wherein the objective lens is shifted to a location that corresponds to the focus error signal having the greatest magnitude.

3. The method of claim 1, wherein shifting the objective lens reduces misalignment in a pickup of the optical disk device.

4. The method of claim 1, wherein the objective lens is in a pickup.

5. The method of claim 1, wherein the focus error signals are S-shaped curves detected, respectively, while the objective lens is moved in at least one of the radially inward or radially outward directions.

6. The method of claim 5, wherein the objective lens is moved in increments in a vertical direction.

7. The method of claim 5, wherein said vertical direction corresponds to a direction of movement of a focus bias adjustment operation during a tracking servo operation.

8. The method of claim 1, wherein said shifting includes:
    shifting the objective lens in a reverse direction relative to an offset direction of a beam reflected from an optical disk.

9. The method of claim 1, further comprising:
    identifying a type of a disk inserted into the optical disk device based on the focus error signals.

10. The method of claim 1, wherein said shifting includes:
    moving the objective lens while performing a tracking balance adjustment operation when a focusing servo is turned on.

11. A method of compensating for misalignment in an optical disk device, the method comprising:
    detecting a focus error signal;
    comparing the focus error signal to a reference signal; and
    shifting radially an objective lens to reduce a magnitude of a difference between the focus error signal and the reference signal, the objective lens shifted from a first location to a plurality of second locations which correspond to predetermined displacements from the first location, wherein:
    each of the second locations corresponds to one of a radially inward direction or a radially outward direction relative to the first location,
    at least one of the second locations arranged at the radially outward direction relative to the first location include a series of locations or the second locations arranged at the radially inward direction relative to the first location include a series of locations, and the focus error signal is generated independently from information corresponding to a drive signal for moving a position of the objective lens to a corresponding one of the first and second locations.

12. The method of claim 11, wherein the focus error signal is an S-shaped curve detected while the objective lens is moved in a predetermined direction.

13. The method of claim 12, wherein the objective lens is moved in a vertical direction.

14. The method of claim 12, wherein said predetermined direction corresponds to a direction of movement in a focus bias adjustment operation during a tracking servo operation.

15. The method of claim 12, wherein said predetermined direction is up and down in a vertical direction.

16. The method of claim 11, wherein said comparing includes:
    comparing a waveform of the focus error signal to a waveform of the reference signal.

17. The method of claim 16, wherein maximum magnitudes of the waveforms are compared.

18. The method of claim 16, further comprising:
    determining an amount of misalignment in locations of one or more elements in an optical pickup based on a difference between the waveforms.

19. The method of claim 18, wherein said one or more elements include a lens or a photodetector in the optical pickup.

20. The method of claim 18, wherein the amount of misalignment corresponds to a degree to which a beam reflected from an optical disk deviates from an aligned position.

21. The method of claim 11, wherein said shifting includes:
shifting the objective lens in a reverse direction relative to an offset direction of a beam reflected from an optical disk.

22. The method of claim 11, further comprising:
applying a voltage to an actuator to move the objective lens in a direction which reduces the difference between the focus error signal and the reference signal.

23. The method of claim 11, further comprising:
storing the reference signal in a memory.

24. The method of claim 11, further comprising:
identifying a type of a disk inserted into the optical disk device based on the focus error signal.

25. The method of claim 11, wherein said shifting includes:
moving the objective lens while performing a tracking balance adjustment operation when a focusing servo is turned on.

26. An apparatus to compensate for misalignment in an optical device, the apparatus comprising:
an optical pickup;
a servo circuit to move an objective lens of the optical pickup; and
a controller which detects focus error signals at a plurality of locations including a first location which corresponds to an initial location of the objective lens and second locations of the objective lens which correspond to predetermined displacements from the first location in radially inward and outward directions, detects magnitudes of the focus error signals, and shifts radially the objective lens according to the detected magnitudes of the focus error signals to reduce misalignment in the optical device,
wherein each focus error signal is generated independently of information corresponding to drive signals of the servo circuit for moving a position of the objective lens to a corresponding one of the first and second locations, and
wherein at least one of the second locations arranged at the radially outward direction relative to the first location includes a series of locations, or at least one of the second locations arranged at the radially inward direction relative to the first location includes a series of locations.

* * * * *